US011843339B2

(12) United States Patent
Akin et al.

(10) Patent No.: US 11,843,339 B2
(45) Date of Patent: Dec. 12, 2023

(54) SYSTEM FOR ESTIMATING A NUMBER OF SHORTED TURNS IN A PERMANENT MAGNET SYNCHRONOUS MOTOR WITH INTER TURN SHORT CIRCUIT FAULTS

(71) Applicant: Board of Regents, The University of Texas System, Austin, TX (US)

(72) Inventors: Bilal Akin, Austin, TX (US); Kudra Baruti, Austin, TX (US); Vigneshwaran Gurusamy, Austin, TX (US); Feyzullah Erturk, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/152,947

(22) Filed: Jan. 20, 2021

(65) Prior Publication Data

US 2022/0231629 A1    Jul. 21, 2022

(51) Int. Cl.
*H02P 29/02* (2016.01)
*H02P 29/024* (2016.01)

(52) U.S. Cl.
CPC ........ *H02P 29/024* (2013.01); *H02P 2207/05* (2013.01)

(58) Field of Classification Search
CPC .................. H02P 29/024; H02P 2207/05
See application file for complete search history.

(56) References Cited

U.S. PATENT DOCUMENTS

| | | | | |
|---|---|---|---|---|
| 6,262,550 B1* | 7/2001 | Kliman | ............... | G05B 23/0264 318/565 |
| 8,054,084 B2* | 11/2011 | Schulz | ................. | G01R 31/346 324/545 |
| 8,253,365 B2* | 8/2012 | Yeh | ....................... | G01R 31/343 318/434 |
| 2014/0159621 A1* | 6/2014 | Gu | ....................... | H02P 29/032 318/400.02 |

(Continued)

OTHER PUBLICATIONS

Zafarani et al. "Inter-turn Short Circuit Faults in Permanent Magnet Synchronous Machines: An Extended Review and Comprehensive Analysis. IEEE Journal of Emerging and Selected Topics in Power Electronics", Dec. 2018. pp. 2173-2191.*

*Primary Examiner* — Rina I Duda
(74) *Attorney, Agent, or Firm* — Schott, P.C.

(57) ABSTRACT

A system and method estimate the fault severity index and consequently the number of shorted turns in permanent magnet motors (PMSM) with inter turn short circuit fault (ITSC). In this method, the machine is excited with DC current at stand still conditions to obtain the winding resistance seen by the d-axis of the machine. The estimated d-axis resistance contains useful information pertaining to the fault severity index, and is used to extract the fault severity index and the number of shorted turns in the faulty motor. The method enables the estimation of fault severity index without complex modeling with different machine prototypes, or FEA models to analyze the relationship between machine currents and short circuit current. To enhance the accuracy of the estimation method, this disclosure addresses issues associated with inverter non-linearity (Continued)

effects such as distortion voltage due to dead time effects and voltage drops across the switching devices.

11 Claims, 10 Drawing Sheets

(56) References Cited

U.S. PATENT DOCUMENTS

| | | | | |
|---|---|---|---|---|
| 2015/0372631 A1* | 12/2015 | Fedigan | .............. | H02P 29/0241 |
| | | | | 318/490 |
| 2016/0041228 A1* | 2/2016 | Gerada | .................. | H02K 11/20 |
| | | | | 310/156.01 |

* cited by examiner

Table I
Parameters of motor

| | |
|---|---|
| Rated power | 2kW |
| Rated speed | 8000 RPM |
| Rated current | 7 A peak |
| Number of poles | 8 |
| Stator resistance $R_s$ | 1.55 Ohms |
| $L_s$ | 0.0021 |

FIG. 13A

Table II
Parameters of motor B

| | |
|---|---|
| Rated power | 0.4kW |
| Rated speed | 3000 RPM |
| Rated current | 2.8 A peak |
| Number of poles | 8 |
| Stator resistance $R_s$ | 2.65 Ohms |
| $L_s$ | 0.0084 |

FIG. 13B

Table III
Parameters of motor C

| | |
|---|---|
| Rated power | 0.7kW |
| Rated speed | 1800 RPM |
| Rated current | 5 A peak |
| Number of poles | 6 |
| Stator resistance $R_s$ | 1.38 Ohms |
| $L_d, L_q$ | 10mH, 21.85mH |

FIG. 13C

Table IV
Experimental results, motor A

| $N_s$ | Healty | 1 | 2 | 5 |
|---|---|---|---|---|
| $R_{ah,pu}$ | 0.07622 | 0.0752 | 0.0746 | 0.0714 |
| Actual $\eta$ | 0 | 0.0159 | 0.0317 | 0.0794 |
| Estimated $\eta$ | 0 | 0.0198 | 0.0287 | 0.0741 |
| Estimated $N_s$ | 0 | 1 | 2 | 5 |

FIG. 13D

Table V
Experimental results, motor B

| $N_s$ actual | 21 |
|---|---|
| Estimated $R_{ah,pu}$ | 0.1033 |
| Actual $\eta$ | 0.09859 |
| Estimated $\eta$ | 0.0988 |
| Estimated $N_s$ | 21 |

FIG. 13E

Table VI
Experimental results, motor C

| $N_s$ | Healty | 10 | 20 | 41 |
|---|---|---|---|---|
| $R_{ah,pu}$ | 0.0598 | 0.0578 | 0.0556 | 0.0515 |
| Actual $\eta$ | 0 | 0.0049 | 0.0980 | 0.201 |
| Estimated $\eta$ | 0 | 0.0501 | 0.105 | 0.208 |
| Estimated $N_s$ | 0 | 10 | 21 | 42 |

FIG. 13F

SYSTEM FOR ESTIMATING A NUMBER OF SHORTED TURNS IN A PERMANENT MAGNET SYNCHRONOUS MOTOR WITH INTER TURN SHORT CIRCUIT FAULTS

BACKGROUND

Permanent magnet synchronous motors (PMSM) have been gaining popularity in electrification of transportation, oil and gas, and automation systems due to their high power density, high torque density and their high efficiency. The widespread deployment of these motors introduces reliability concerns, thus continuous monitoring of the state of health for these motors may be needed in order to prevent unforeseen catastrophes and unexpected shutdowns. When the state of health of these machines is not monitored continuously, different motor faults can develop that may lead to operational shutdown of the motors if they are not dealt with in their earliest stages.

Amongst the well-known faults, the stator faults, specifically the inter turn short circuit faults (ITSC) occurs most frequently, and present a higher level of difficulty in detection. If ignored, the ITSC fault may cause higher circulating current in the stator, which can in turn cause open circuit faults and complete damage to the winding of the machine. An inter turn short circuit fault occurs when the insulation of the winding melts, which causes some parts of the winding to come into contact with other parts. Insulation failure can be a result of high thermal stress on the stator, excess current in the windings, mechanical stress, and aging of the insulation material.

Several diagnostic and detection algorithms have been developed based on motor variable dynamics, machine model, and a hybrid fault diagnosis. The most commonly used method is the motor current signature analysis (MCSA) that analyzes certain harmonics in the current frequency spectrum to diagnose faults. This method focuses on the fast Fourier transform (FFT) of the current spectrum and identifies key harmonics associated with certain kinds of motor faults. The results from MCSA are, however, heavily dependent on machine model operating point and winding configuration. Thus, results from MCSA can be misleading. In addition, some signatures in the current spectrum are suppressed by current controllers, and thus, the observability and amplitude of these signatures may be highly dependent upon current controller coefficients.

In additional to the Fourier-transform-based traditional approaches, some other methods employ symmetrical components by leveraging unbalance of three phase systems when a fault is introduced. These methods observe the zero sequence components and negative sequence components of both voltage and currents as fault precursors. For instance, an ITSC fault diagnosis tool may be developed for PM machines using online second harmonic extraction of voltage reference vector in dq frame. The amplitude of this harmonic is dependent on the ITSC fault severity and the detection is realized by comparing the healthy and faulty magnitude of this second harmonic that is derived using a proper time domain transformation.

Some studies use parameter variation to diagnose ITSC fault using for example, a diagnosis method based on self-commissioning of the motor. The changes in stator winding impedance, in such a case, may be observed by parameter identification and used as fault precursor, while taking into consideration the saturation effects of the winding core. Another approach may be to monitor the changes in back EMF following a fault through state observers and propose certain changes as a fault indicator. For instance, a real time inter turn fault diagnosis observer may be developed for PM drives based on back EMF estimation. Similarly, an online inter-turn short circuit detection method may use an extended non-linear state observer (ESO) to estimate the back EMF of a Permanent Magnet Synchronous Motor (PMSM) motor. This observer is complex and mathematically intensive, however, and requires a very fast processor.

In another approach, high frequency signal injection and analysis of the corresponding motor current response may be employed in the diagnosis of ITSC faults in a PMSM. In this method, a low amplitude, high frequency current is injected into the motor at stand still conditions, and the variation of motor parameters is used to detect the ITSC fault. Based on the parameter analysis, the phase in which the fault is located can be determined. Within the same study, a distinction is made between ITSC faults and eccentricity faults which exhibit similar characteristics. A high frequency voltage injection algorithm may be employed where high frequency voltages are injected in alpha-beta stationary coordinates, and their response is evaluated in the synchronous rotating frame. Space Modulation Profiling (SMP) may also be used to obtain the magnetic signature of a machine operation in healthy and faulty conditions, and a comparison is made to diagnose the fault.

A winding conditioning monitoring scheme for PM machines using high frequency signal injection may observe the change in the magnetic structure owing to presence of electric faults. The magnetic structure may be observed by measuring incremental inductance of the windings and comparing it to a healthy case. This method is affected by saturation of the motor core, and the results of the measured inductance values may vary depending on the operating point and hence fail to establish a robust baseline for fault severity estimation.

In practice, an ITSC fault severity index is defined as the ratio of the number of shorted turns in the winding to the total number of turns, in the particular phase in which the fault occurred. The amplitudes of fault signatures are also directly related to the fault severity index. As the number of shorted turns increases, the amplitudes of the signatures increase as well. Some experts have suggested a standard related to severity estimation of inter turn short circuit fault for PMSM, in which a low frequency sinusoidal voltage is injected at standstill conditions and uses the variations in the current response to estimate the number of shorted turns. This method requires phase voltage measurement across the terminals of the inverter, however, which requires the use analog filters to suppress high frequency PWM noises. Also, the selection of a proper injection frequency is somewhat ambiguous. A very low injection frequency will result in undesirable rotor movement and too high frequency will cause errors in estimated result. The method and system described herein introduces a robust method that gets rid of the aforementioned ambiguity. In other approaches, the fault severity index and ultimately the number of shorted turns is considered to be an unknown parameter, despite the fact that it plays a significant role in the dynamics of the faulty machine. The fault severity index must be estimated in order to quantify the damage in the winding of the machine, estimate the short circuit current and thus defining a safe operating area (SOA), avoiding total damage and unexpected shutdowns. Furthermore, knowledge of this index makes it possible to design effective algorithms to suppress the effects of the fault, thus bringing about longer operation of the machines until a scheduled maintenance occurs.

SUMMARY OF THE EMBODIMENTS

This system and method herein estimate the fault severity index and the number of shorted turns in the winding of PMSM based on the identification of the resistance of the remaining healthy coils in a faulty phase. The motor is excited with DC voltage at standstill, and the resulting DC current is used to calculate the phase resistance of the motor. Based on the calculated resistance, the fault severity of ITSC fault is extracted.

The system and method estimate the fault severity index and consequently the number of shorted turns in PMSM with inter turn short circuit fault (ITSC). In this method, the machine is excited with DC current at stand still conditions to obtain the winding resistance seen by the d-axis of the machine. The estimated d-axis resistance contains useful information pertaining to the fault severity index, and is used to extract the fault severity index and the number of shorted turns in the faulty motor. The method enables the estimation of fault severity index without complex machine modeling and extensive experiments with different machine prototypes, or FEA models to analyze the relationship between machine currents and short circuit current. To enhance the accuracy of the estimation algorithm, this disclosure addresses practical issues associated with inverter non-linearity effects such as distortion voltage due to dead time effects and voltage drops across the switching devices, and proposes method to estimate the fault severity index that is immune to the aforementioned issues. Determining the fault index is critical in order to design appropriate mitigation techniques, as well as defining a safe operating area for the machine to avoid further damage to the winding.

DETAILED DESCRIPTION OF THE EMBODIMENTS

The system and method advantages include at least the following:

A practical ITSC fault severity estimation approach that uses readily available drive current/voltage sensors and doesn't require any additional hardware.

It simplifies the complicated machine model under fault by only considering the changes in the DC circuitry of machine.

It overcomes the complexities regarding selection of injection frequency, and self-inductance estimation of shorted turns.

As a standstill method, it is independent of the load and speed. Also, the key parameters do not depend on motor core saturation or signal frequency.

It inherently rectifies measurement errors due to dead-time effects, inverter non-linearity and voltage drops across the inverter switches, hence improving the accuracy of the estimated result.

It provides a unified approach to estimate the fault severity and number of shorted turns in the windings of all AC motors.

1. ITSC Severity Estimation Algorithm

This section describes a theoretical analysis of the machine under faulty conditions. Part 1.1 describes an analysis of the machine model under fault in stationary coordinates, part 1.2 describes derivation of the machine model under fault in synchronously rotating dq coordinates while part 1.3 describes analysis of distortion voltage under fault conditions, and part 1.4 discusses a detailed development of the estimation algorithm.

1.1 Machine Model Under Fault

Figure 1:
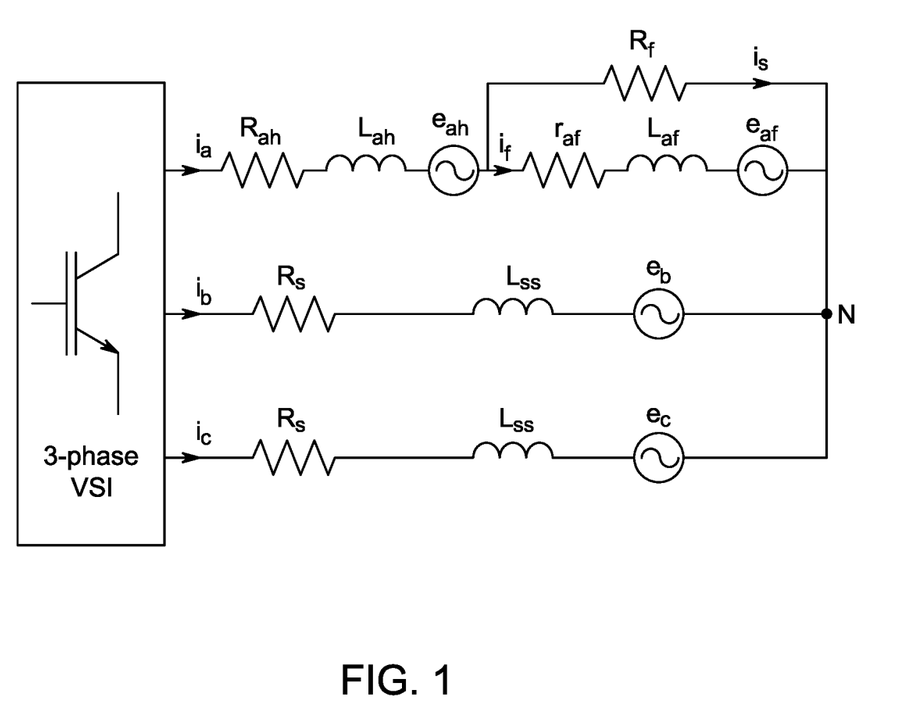
FIG. 1 shows the three-phase equivalent circuit model of a PMSM under ITSC fault.

As a starting point, the three-phase equivalent circuit model of a PMSM under ITSC fault shown below in FIG. 1 will be considered here. FIG. 1 shows a 3-phase inverter (VSI) that generates three parallel currents ia, ib, is through three resistors Rah, Rs, and Rs respectively. The Rs resistors are connected in series to inductors Lss and AC voltage sources eb, ec. The Rah resistor is in parallel with the Rs resistors and in series with an inductor Lah and AC voltage source eah. The output from the AC voltage source eah travels through resistor Rf (generating current if) and in parallel resistor raf, inductor Laf and AC voltage source eaf all in series.

From the model, a matrix representation of the model is developed and summarized in Equation (1).

$$\begin{bmatrix} V_{an} \\ V_{bn} \\ V_{cn} \\ 0 \end{bmatrix} = \begin{bmatrix} R_s & 0 & 0 & R_{sf} \\ 0 & R_s & 0 & 0 \\ 0 & 0 & R_s & 0 \\ -R_f & 0 & 0 & R_f + R_s \end{bmatrix} \begin{bmatrix} i_a \\ i_b \\ i_c \\ -i_s \end{bmatrix} + \begin{bmatrix} L_{ss} & M_s & M_s & \eta L_{ss} \\ M_s & L_{ss} & M_s & \eta M_s \\ M_s & M_s & L_{ss} & \eta M_s \\ \eta L_{ss} & \eta M_s & \eta M_s & \eta^2 L_{ss} \end{bmatrix} \frac{d}{dt} \begin{bmatrix} i_a \\ i_b \\ i_c \\ -i_s \end{bmatrix} + \begin{bmatrix} e_a \\ e_b \\ e_c \\ e_{af} \end{bmatrix} \quad (1)$$

Throughout this, the fault location is assumed to be known, and is on the phase A winding.

From this equation, one can derive the line voltage between two phases. Here, it is assumed that the effect of the fault phase on the other two remaining phases is symmetrical. Now, the line voltage across phase A and B is derived as in Equation (2).

$$V_{ab} = R_s i_a + (L_{ss} - M_s)\frac{di_s}{dt} - \frac{R_s}{2} i_a + \left(\frac{L_{ss}}{2} - \frac{M_s}{2}\right)\frac{di_a}{dt} - \eta R_s i_s - \eta (L_{ss} - M_s)\frac{di_a}{dt} \quad (2)$$

For any machine at standstill conditions, the synchronous inductance is related to its self-inductance and mutual inductance between phases as in Equation (3), $$L_s = L_{SS} - M_s \quad (3)$$

With the above simplification, Equation (2) can be simplified to produce Equation (4)

$$V_{ab} = \frac{3}{2}\left(R_s i_{ss} + L_s \frac{di_a}{dt}\right) - \eta\left(R_s i_s + L_s \frac{di_s}{dt}\right) \quad (4)$$

From Equation (1), the voltage equation of the short circuit loop is derived as follows.

$$\eta\left(R_s i_a + L_s \frac{di_a}{dt}\right) = (R_f + \eta R_s)i_z + L_{ssf}\frac{di_s}{dt} \quad (5)$$

Based on this linear model and Equations (4) and (5), the fault severity can be calculated but this requires the calculation of the shorted turns' self-inductance (Lssf) which is prone to errors. Also, the estimation of Lssf requires high frequency voltage injection to the winding of the motor which increases complexity. Furthermore, measurement of line-to-line voltage is required, but this voltage signal contains PWM noise and additional analog filters are needed to reduce the noise. In the following sections, a method that is independent of both the shorted turns' self-inductance and the line-to-line voltage is developed.

1.2 Machine Model with ITSC Fault in dq-Coordinates.

In the summarized model, the voltage generated at the terminals of the inverter is assumed to be equal to the reference voltage inside the drive. However, in practice this is not true, and it negatively affects the accuracy of experimental findings. Due to the dead time inserted to inverter gate signals and on state voltage drops across them, the reference voltage has to take this distortion voltage into account for accurate calculations. From Equation (1) above, the voltages are modified to Equation (6):

$$\begin{bmatrix} V_{an} \\ V_{bn} \\ V_{cn} \end{bmatrix} = \begin{bmatrix} V_{an\_ref} \\ V_{bn\_ref} \\ V_{cn\_ref} \end{bmatrix} - \Delta V \text{sign} \begin{bmatrix} i_a \\ i_b \\ i_c \end{bmatrix} \quad (6)$$

Where ΔV is the net distortion voltage introduced by the inverter and depends on the signs of the three phase currents. Equation (6) is used in the derivation of the machine model in synchronously rotating (dq) coordinates. The model of the machine in Equation (6) is transformed to dqo coordinates using a Park's transformation matrix which has been modified to account for the presence of the inter turn short circuit fault. The parks transformation is given in Equation (7).

$$T(\theta) = \frac{2}{3}\begin{bmatrix} \cos\theta & \cos(\theta - 2\pi/3) & \cos(\theta + 2\pi/3) & \cos\theta \\ \sin\theta & \sin(\theta - 2\pi/3) & \sin(\theta + 2\pi/3) & \sin\theta \\ 1/2 & 1/2 & 1/2 & 0 \\ 0 & 0 & 0 & 1 \end{bmatrix} \quad (7)$$

Applying this transformation matrix to Equation (6) leads to the following equations.

$$\begin{bmatrix} V_d \\ V_q \\ V_0 \end{bmatrix} = T(\theta)[R_{DC}]T^{-1}(\theta)\begin{bmatrix} i_d \\ i_q \\ i_0 \end{bmatrix} + \quad (8)$$

$$T(\theta)[L_{sf}]\frac{d^{-1}T(\theta)}{dt}\begin{bmatrix} i_d \\ i_q \\ i_0 \end{bmatrix} + T(\theta)[L_{sf}]T^{-1}(\theta)\begin{bmatrix} i_d \\ i_q \\ i_0 \end{bmatrix} + T(\theta)\begin{bmatrix} e_n \\ e_b \\ e_c \end{bmatrix} \text{ where,}$$

$$T(\theta)\begin{bmatrix} V_{sn\_ref} \\ V_{bn\_ref} \\ V_{cn\_ref} \end{bmatrix} = \begin{bmatrix} V_d \\ V_q \\ V_o \end{bmatrix}, \quad (9)$$

$$R_{DC} = \begin{bmatrix} R_s & 0 & 0 & R_{sf} \\ 0 & R_s & 0 & 0 \\ 0 & 0 & R_s & 0 \\ -R_f & 0 & 0 & R_f + R_{sf} \end{bmatrix},$$

$$L_{sf} = \begin{bmatrix} L_{ss} & M_s & M_s & \eta L_{ss} \\ M_s & L_{ss} & M_s & \eta M_s \\ M_s & M_s & L_{ss} & \eta M_s \\ \eta L_{ss} & \eta M_s & \eta M_s & \eta^2 L_{ss} \end{bmatrix}$$

From Equations (8) and (9), the following equation can be derived:

$$V_o = -\frac{1}{3}\eta R_s i_s - \frac{1}{3}\eta(L_s + 2M_s)\frac{di_s}{dt} \quad (10)$$

Equation (10) is the neutral axis voltage. In this disclosure, the neutral axis voltage is not used in calculation of the shorted turns' number. The information required for estimation of shorted turns' number is available in the d-axis and q-axis voltages. The d and q axis voltages are expanded to the following form in Equation (11):

$$V_d = \quad (11)$$

$$R_s i_d - \omega L_s i_q + L_s \frac{di_d}{dt} + \frac{2}{3}\eta\cos\theta\left[R_s(i_d\cos\theta - i_q\sin\theta) - \left(2R_s + \frac{R_f}{\eta}\right)i_z\right] -$$

$$\frac{2}{3}\eta\cos\theta[\omega L_s(i_q\sin\theta - i_q\cos\theta)] + V_{dist,d} +$$

$$\frac{2}{3}\eta\cos\theta\left[L_s\left(\cos\theta\frac{di_d}{dt} - \sin\theta\frac{di_q}{dt}\right) - (L_s + \eta L_{ss})\frac{di_s}{dt}\right]$$

and Equation (12):

$$V_q = R_s i_d - \omega L_s i_q + L_s \frac{di_d}{dt} + \omega\lambda_{PM} + \quad (12)$$

$$\frac{2}{3}\eta\sin\theta\left[R_s(i_d\cos\theta + i_q\sin\theta) + \left(2R_s + \frac{R_f}{\eta}\right)i_s\right] +$$

$$\frac{2}{3}\eta\sin\theta[\omega L_s(i_q\sin\theta + i_q\cos\theta)] + V_{dist,q} +$$

-continued $$\frac{2}{3}\eta\sin\theta\left[-L_s\left(\cos\theta\frac{di_d}{dt}+\sin\theta\frac{di_q}{dt}\right)+(L_s+\eta L_{ss})\frac{di_s}{dt}\right]$$

$$\begin{bmatrix}V_{dist,d}\\V_{dist,q}\end{bmatrix}\begin{bmatrix}\cos\theta & \cos(\theta-2\pi/3) & \cos(\theta+2\pi/3)\\-\sin\theta & -\sin(\theta-2\pi/3) & -\sin(\theta+2\pi/3)\end{bmatrix}\begin{bmatrix}\text{sign}(i_a)\\\text{sign}(i_b)\\\text{sign}(i_c)\end{bmatrix} \quad (13)$$

Equation (13) Represents the voltage distortion due to inverter dead time. The distortion voltage depends on the signs of the currents iabc.

1.3 Analysis of Distortion Voltage Under Stationary Condition

In the implementation of the severity estimation method, d-axis voltage reference available inside the controller is used. Errors in this voltage are may be appreciably compensated. As mentioned earlier, the number of shorted turns' estimation is done at standstill. By observing the behavior of the distortion voltage at stand still conditions with respect to motor current, a simple but yet effective method is developed to get rid of the effects of inverter distortion voltage. Under stationary condition and DC excitation, voltage drops across the inductors can be ignored. Since the back electromotive force is zero, the motor can be modeled as a three phase resistive load. In this sense, the reference voltage will be in phase with the output current when the output currents are regulated as Equation (14).

$$i_d>0, i_q=0 \quad (14)$$

Then Equation (15):

$$\begin{bmatrix}i_a\\i_b\\i_c\end{bmatrix}=T^{-1}(\theta)\begin{bmatrix}i_d\\i_q\\i_o\end{bmatrix}=\begin{bmatrix}i_d\\-\frac{i_d}{2}\\-\frac{i_d}{2}\end{bmatrix} \quad (15)$$

Figure 2:
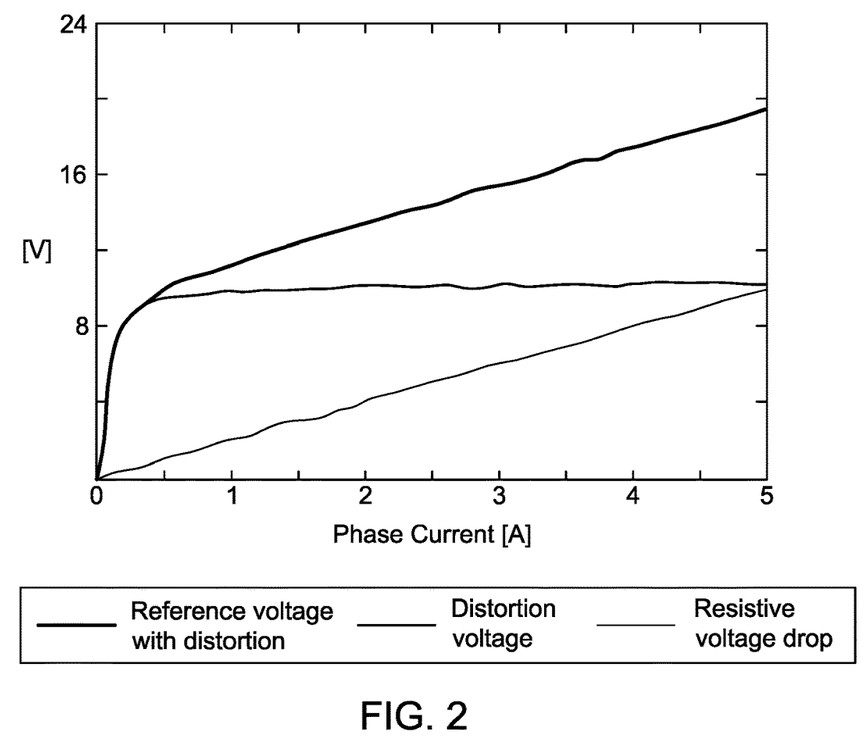
FIG. 2 shows experimental results of the reference voltage under DC excitation, both with and without distortion voltage.

FIG. 2 shows experimental results of the reference voltage under DC excitation, both with and without distortion voltage. The voltage plot is experimentally obtained by sweeping DC currents at different operating points at standstill and storing the corresponding DC voltages at each point. The currents are regulated from 0 A to 5 A with increments of 0.5 A, and then the resulting voltage value at each operating point is stored in controller memory and plotted against the corresponding current value. When the dead time effects are appreciably compensated, the voltage reference can be considered as a pure resistive drop across the stator resistance Rs.

From FIG. 2, it can be concluded that the voltage distortion behaves as a non-linear current dependent resistor. It varies linearly with current in the low current region, and settles to a fairly constant value in the high current region. These findings are used in the next section to eliminate the distortion voltage and corresponding calculation errors.

1.4. Current Injection Strategy

Figure 3:
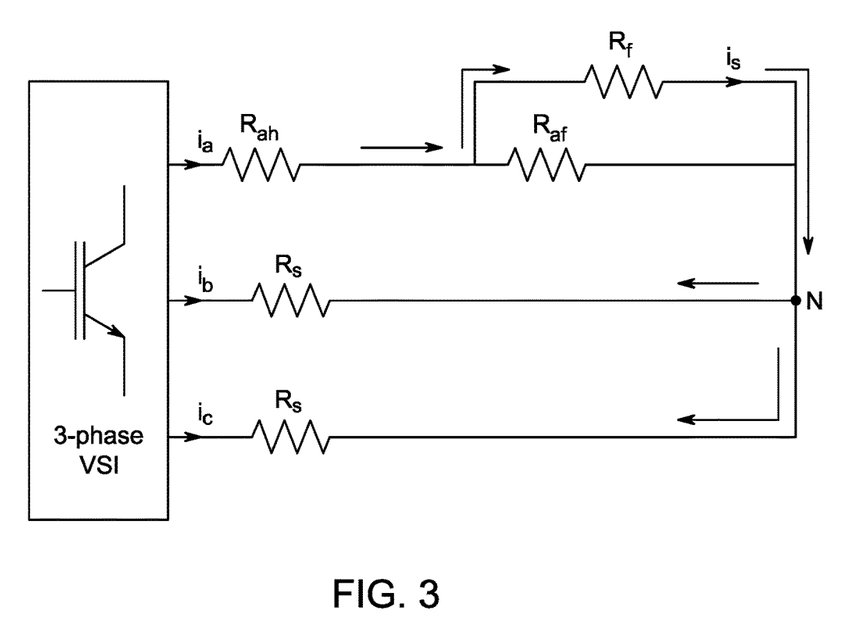
FIG. 3 is the equivalent circuit of an AC motor under DC excitation.

The voltage model in Equations (11) and (12) is used to implement the severity estimation algorithm by injection of a suitably selected current pair to the d-axis of the motor. Since the algorithm is run at stand still conditions, the reference current to the quadrature axis is set to zero (iq=0) to ensure that no net torque is produced. In this procedure, the fault resistance (Rf) is assumed to be zero. Practically, this resistance is in the order of milli or micro ohms when two conductors touch each other. In this case, when DC current is injected to the d-axis, the DC circuitry of the machine looks as shown in FIG. 3, with some similar nomenclature to FIG. 1.

Here, it is obvious that the current in the phase A of the motor flows through the path of the least resistance which include Rf (near zero resistance). This implies that no current flows through the resistance Raf, which further implies that id and is are the same current. Since the reference current to the q-axis is maintained at zero (iq=0), the dq-axes voltages of the motor now become as follows in Equation 16.

$$\begin{cases}V_d=R_s i_d+\frac{2}{3}\eta\cos\theta[R_s i_d\cos\theta-2R_s i_d]+KV_{dist,d}\\V_q=0\end{cases} \quad (16)$$

where, $KV_{dist}$ represents the net voltage distortion due to inverter dead time effects and the voltage drops across the switching devices of the inverter. Since the machine is stationary and there is no net torque produced when $i_q$=0, all the terms containing speed automatically converges to zero (w=0).

$$K=\frac{2}{3}\left(|\cos\theta|+\left|\cos\left(\theta-\frac{2\pi}{3}\right)\right|+\left|\cos\left(\theta+\frac{2\pi}{3}\right)\right|\right) \quad (17)$$

Figure 4:
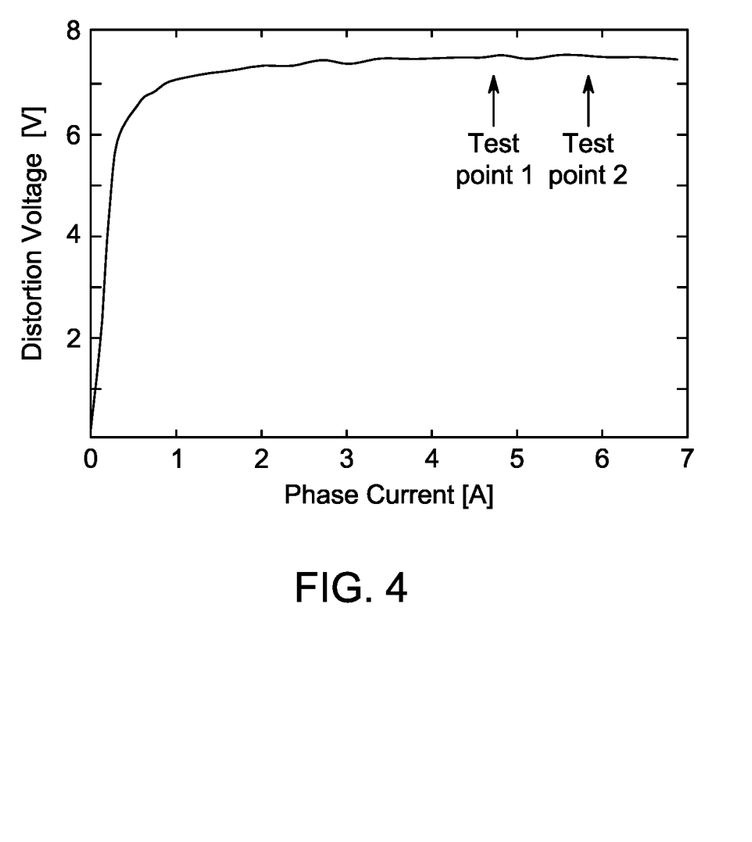
FIG. 4 shows the relationship between distortion voltage and phase current.

The relationship between distortion voltage and phase current is expounded in FIG. 4. Distortion voltage is observed to be constant in the high current region as seen in FIG. 4. Two distinct currents are injected in this region. When the difference between the two resulting voltages is taken, effects of the distortion voltage cancel each other. In this way, voltages inside the controller are considered to be pure resistive drops on the resistance seen by the d-axis. Hence distortion voltage is automatically nullified in the control voltage.

When two distinct d-axis currents are injected the high current region of the distortion voltage curve, Equation (17) results in model given by Equation (18).

$$\begin{cases}V_{d1}=R_s i_{d1}+\frac{2}{3}\eta\cos\theta[R_s i_{d1}\cos\theta-2R_s i_{d1}]+KV_{dist,d}\\V_{d2}=R_s i_{d2}+\frac{2}{3}\eta\cos\theta[R_s i_{d2}\cos\theta-2R_s i_{d2}]+KV_{dist,d}\end{cases} \quad (18)$$

In order to further simplify the analysis, the fault is assumed to be in phase A of the motor and the current injection is performed when the rotor is aligned to its zero position, i.e. θ=0. However, the algorithm can be deployed to work at any rotor angle and any fault phase.

When the above assumption is considered, Equation (18) further simplifies to Equation (19)

$$\begin{cases}V_{d1}=\left(R_s-\frac{2}{3}\eta R_s\right)i_{d1}+KV_{dist,d}\\V_{d2}=\left(R_s-\frac{2}{3}\eta R_s\right)i_{d2}+KV_{dist,d}\end{cases} \quad (19)$$

The difference $V_{d2}-V_{d1}$ is calculated, and then the fault severity index is calculated based on the following Equation (20).

$$\frac{2}{3}\eta = 1 - \frac{(V_{d2} - V_{d1})}{(i_{d2} - i_{d1})R_s} \quad (20)$$

From Equation (20), recognize that the right-side fraction calculates the resistance seen by the d-axis of the motor, which is equal to the resistance of the remaining health coils of the motor as shown in FIG. 3. Hence, Equation (20) simplifies to Equation (21) below.

$$\frac{2}{3}\eta = 1 - \frac{R_{sk}}{R_s}. \quad (21)$$

Figure 5:
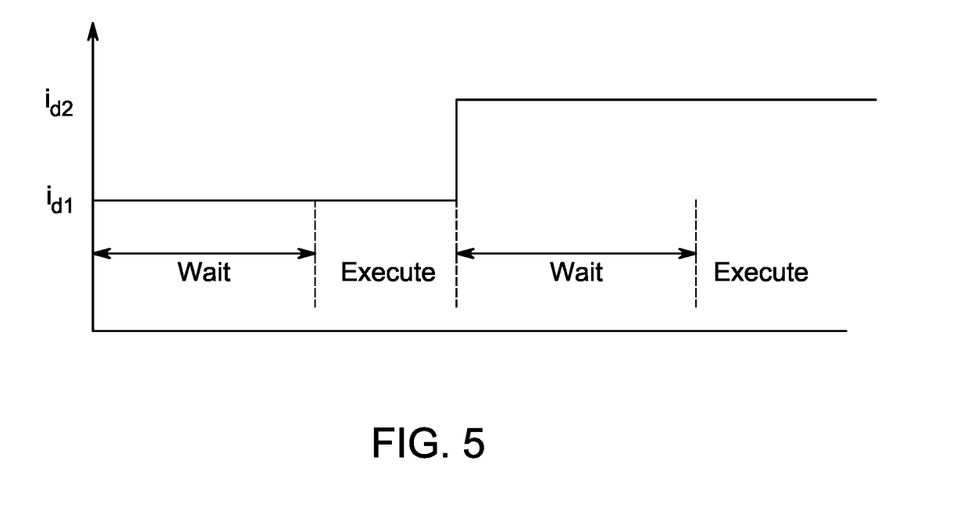
FIG. 5 shows the DC injection strategy for estimation of the resistance of the remaining healthy coils.

Here, Rs is a known parameter, representing the resistance of the motor in healthy case. The task of this algorithm remains to estimate the resistance of the remaining healthy coils, Rah. Computation of Rah is done inside the microcontroller, and any averaging tool can be used to calculate the magnitudes of both current and voltage such as DFT. To further enhance the accuracy of estimation of Rah, when current is injected, the PI controllers are allowed to settle in steady state by waiting a short period of time, which is calculated based on the settling time of the current controllers. This wait time is pictorially illustrated in FIG. 5. When the PI controllers settle, estimation is executed. The above derivation is made for the case in which θ=0, but can be performed at any known rotor position as shown in Equation (18).

2. Experimental Setup and Results

Figure 6:
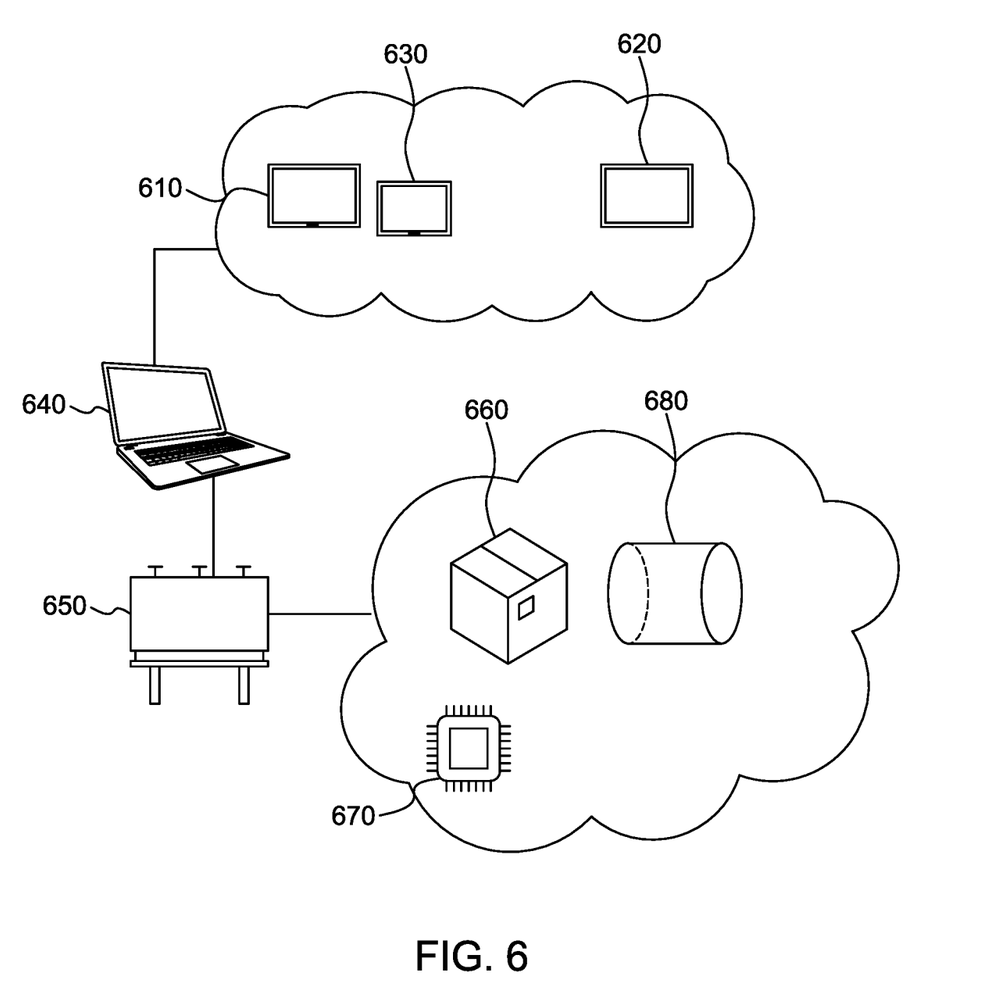
FIG. 6 shows an experimental setup that drives, monitors, controls, and shares data.

FIG. 6 shows an experimental setup including a DC power supply 610, oscilloscope 620, load controller 630, PC 640 data acquisition devices 650, hysteresis dynamometer 660, MCU 670, and the motor 680. These components work together to drive, monitor, control, and share data.

Figure 13A:
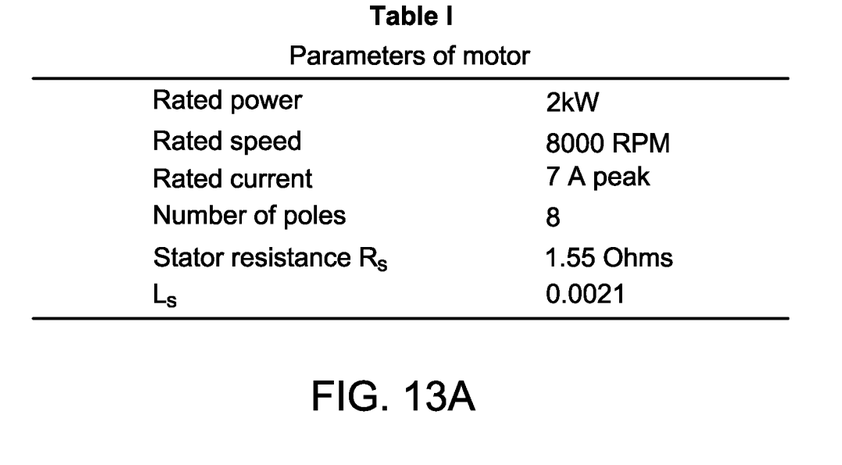
FIG. 13A shows Table I.
Figure 13B:
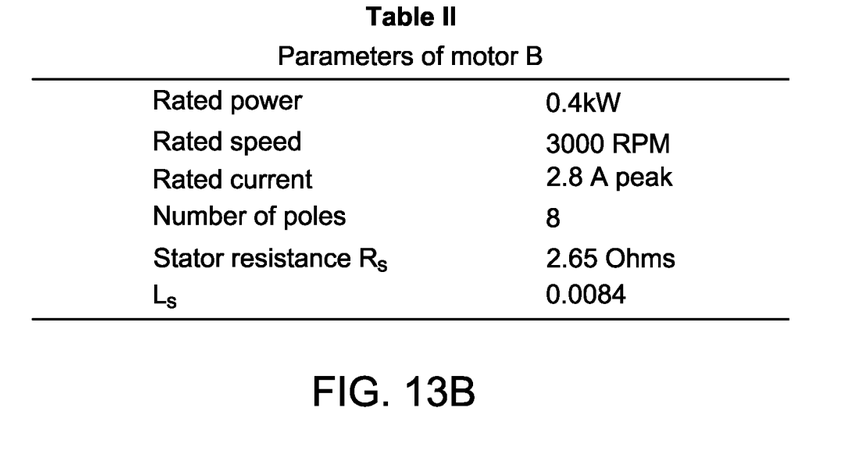
FIG. 13B shows Table II.
Figure 13C:
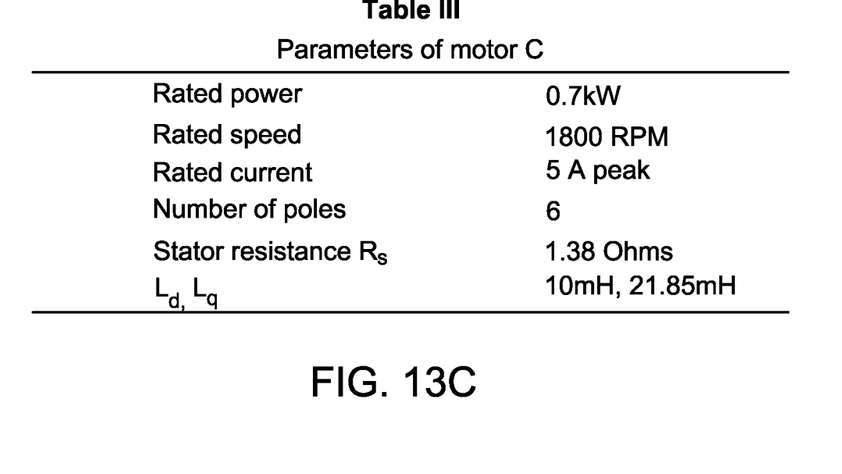
FIG. 13C shows Table III.

During the experiments, two PMSMs (Motor A and Motor B) and one IPMSM (Motor C) are used in verifying the efficacy and applicability of the proposed algorithm. (Tables I, II, and III (FIGS. 13A, 13B, and 13C) respectfully show parameters of these motors.) These motors have artificially induced winding faults to mimic ITSC. The winding of motor A, a PMSM, is modified such that the number of shorted turns $N_s$ is 1, 2 and 5. This is done by connecting taps to the $1^{st}$, $2^{nd}$ and $5^{th}$ turn of a coil in Phase B of the motor. This was done in order to study how the short circuit current change with respect to changing the fault severity.

The second test PMSM motor (Motor B), is an 8 slot 9 pole PMSM with concentrated stator winding. 10% stator fault is induced in its winding, which corresponds to shorting 21 turns together. The inter turn short circuit fault is introduced on the winding of Phase A.

The third motor, Motor C, is an interior permanent magnet machine with artificial taps induced on its stator winding to mimic ITSC fault. In this motor, turns are shorted to produce 5%, 10% and 20% fault severity, which corresponds to shorting 10, 20 And 41 turns respectively. All these turns were shorted in the coils of phase A winding.

The motors are driven by an inverter that is controlled by TMS32028069 microcontroller from Texas Instruments. Switching frequency, ISR and sampling frequency are all set to 10 kHz. The PI current controllers are tightly tuned and their bandwidth set to 1000 Hz. A well-tuned current controller guarantees satisfactory transient state performance, which ensures a small waiting window of time for PI controllers to settle before the algorithm executes estimation. In order for this method to work, the faulty phase may need to be known, and this phase should be aligned to the excitation. This disclosure assumes that the faulty phase is already known. A sensor is connected in the short circuit path of the shorted winding to measure the short circuit current.

Figure 7A:
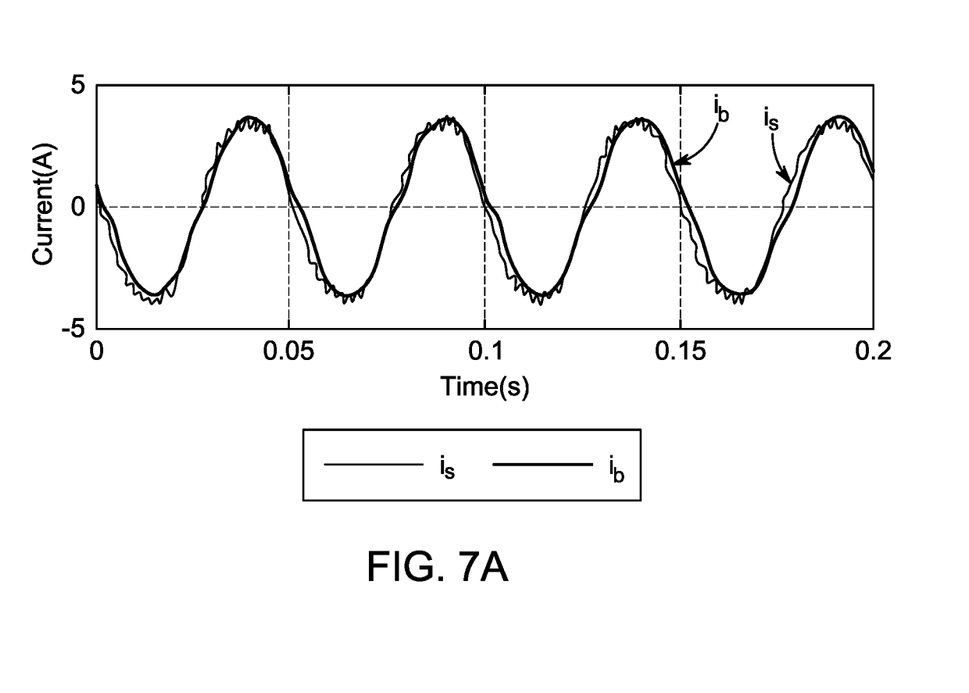
FIGS. 7 and 8 show graphs of phase current and short circuit current plotted together.
Figure 7B:
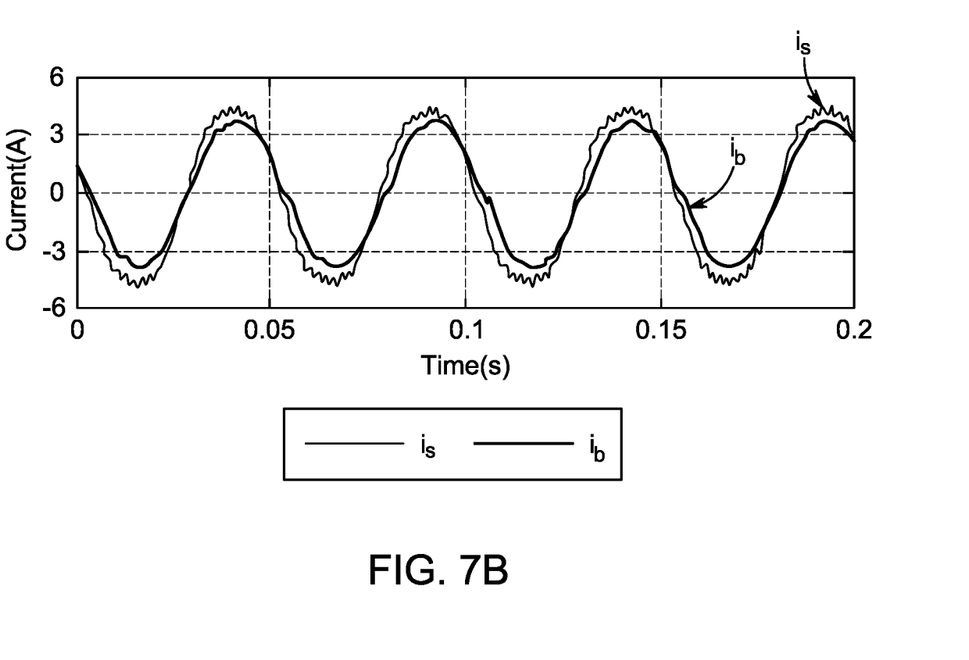
Figure 8A:
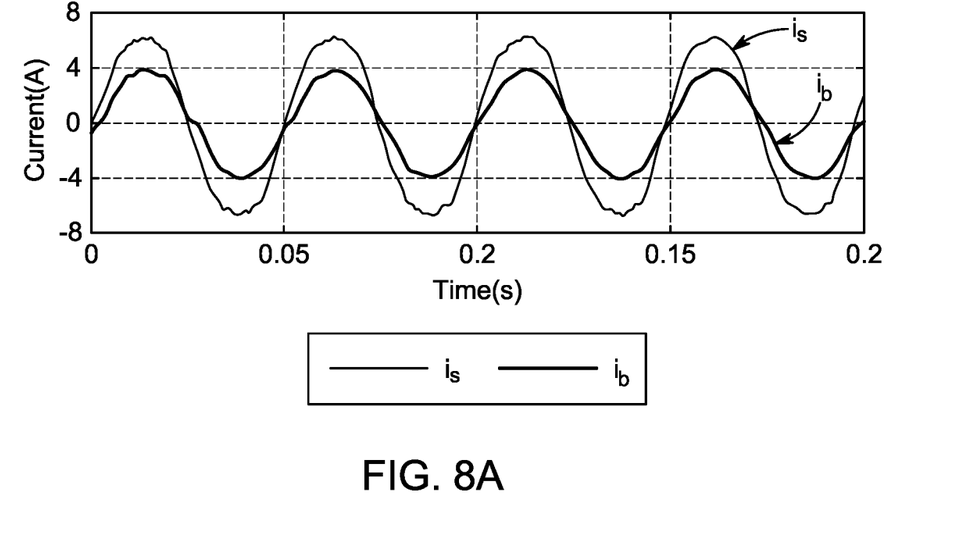
Figure 8B:
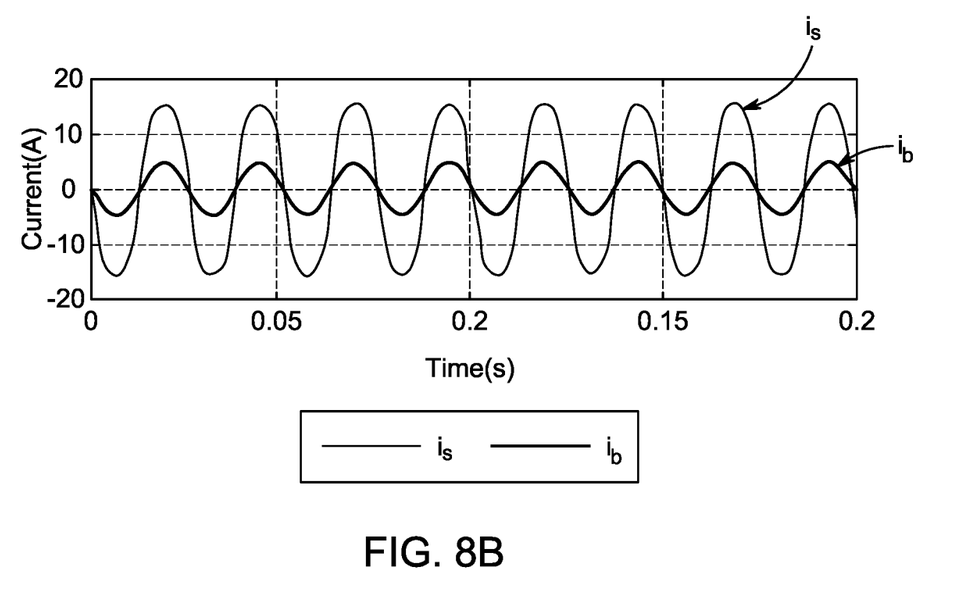
Figure 9:
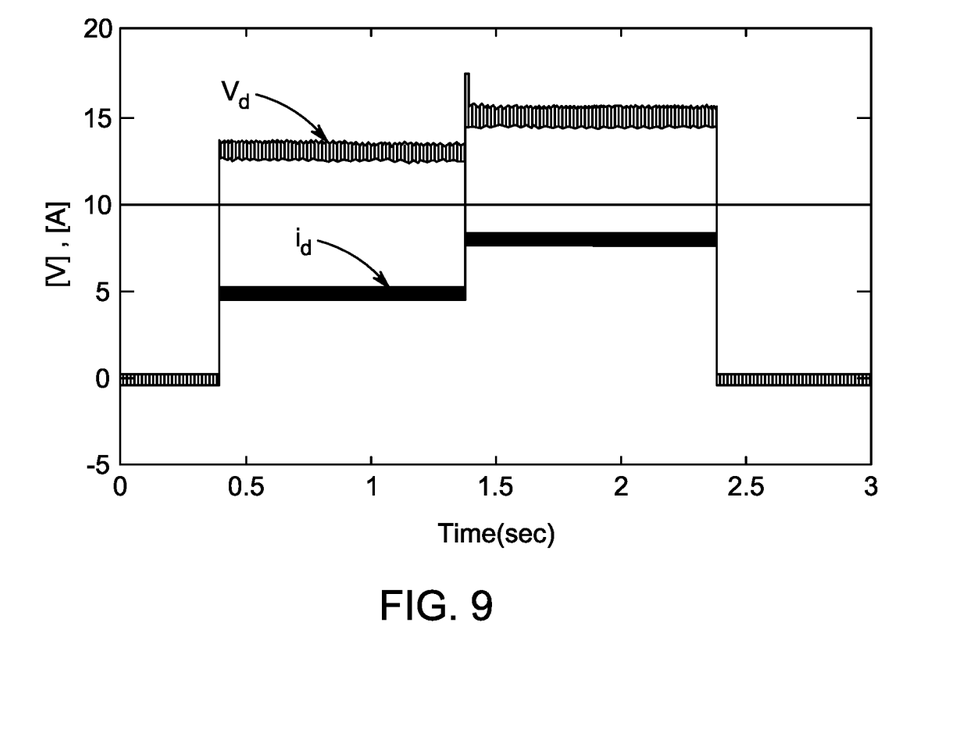
FIG. 9 shows an experimental plot of d-axis current injection strategy and the resulting d-axis voltage during identification of the fault severity index for motor A.

An investigation is performed to observe the relationship between the short circuit current with the fault severity and operating speed of the motor. FIGS. 7 and 8 show graphs of phase current and short circuit current plotted together. These results reveal two key points. First of all, as more turns are shorted, more current flows in the short-circuited path at a given speed. As shown in the FIG. 7, at 300 RPM, higher current flows in the short-circuited path as the number of shorted turns increase. This is in accordance with Faraday's law of induction. As more turns are shorted, more back electromotive force is induced in the shorted coil, and hence more current flows. On the other hand, FIG. 8 shows that as the speed increases, the current in the short circuit path increases tremendously and dangerously, which can lead to complete meltdown of winding insulation and hence permanent damage to the machine. This observation is also in agreement with the Faraday's law of induction.

Since the proposed method entails DC current injection in the d-axis of the motor at standstill, only d-axis voltage reference is required, and needs to be calculated via DFT or any other averaging tool. The use of voltage sensors to measure phase or line voltage is avoided which eliminates filtering and corresponding delay compensations. This does not only improve accuracy, but also saves costs of voltage sensors and analog filter implementation.

It is worth noting that the estimation algorithm in this experimental setup might still have some errors because the short circuit is introduced through wire taps, which have some resistance. The algorithm assumes a zero-fault path resistance, and hence the difference between one or two turns might be ambiguous. The algorithm, however, still provides a reasonably accurate estimate of the fault severity index, which gives a very clear picture about the percentage of the motor winding that has been compromised due to ITSC fault. This estimate plays a crucial role in determining criteria for post fault operation.

Figure 10:
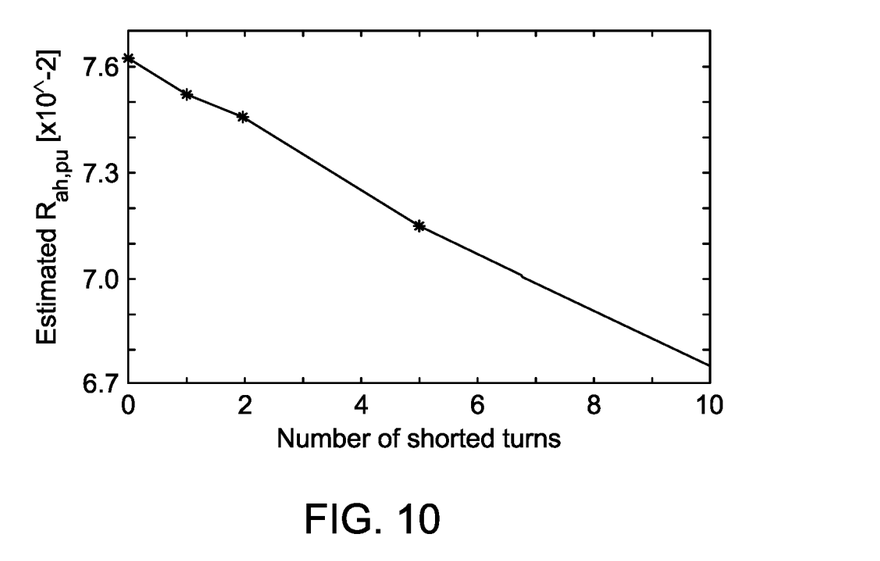
FIG. 10 shows the relationship between the number of shorted turns and resistance of the remaining healthy coils.
Figure 13D:
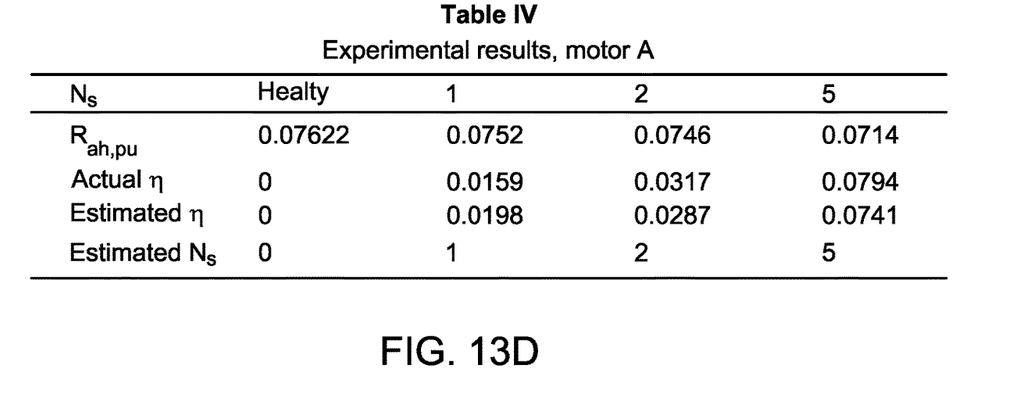
FIG. 13D shows Table IV.

Table IV (FIG. 13D) shows a summary of the experimental results for Motor A. The results show that the proposed algorithm can successfully estimate the fault severity index and hence, the number of shorted turns in a coil of a motor winding. Another way to interpret the results is by observing how the resistance of the remaining healthy coils changes with respect to the number of shorted turns. This relationship is depicted in FIG. 10, and shows that the resistance of the remaining health coils varies inversely proportional to the number of shorted turns in the stator winding. When the number of shorted turns increases, the resistance seen by the remaining healthy phases decreases linearly.

Figure 13E:
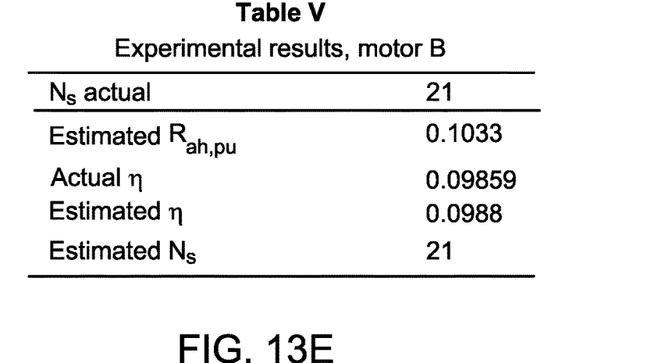
FIG. 13E shows Table V.

FIG. 10 shows that if the resistance in the short circuit path is considered to be negligibly small, no current flows through the shorted turns during a stand still DC excitation and thus, the effective resistance seen by the d-axis of the motor decrease linearly with increasing number of shorted turns. When the proposed method is experimentally executed using Motor B, the severity of the inter-turn short circuit fault is estimated accurately as summarized in Table V (FIG. 13E). In this motor, only one tap was available and hence experimental result is provided only at 21 turns short.

Figure 11:
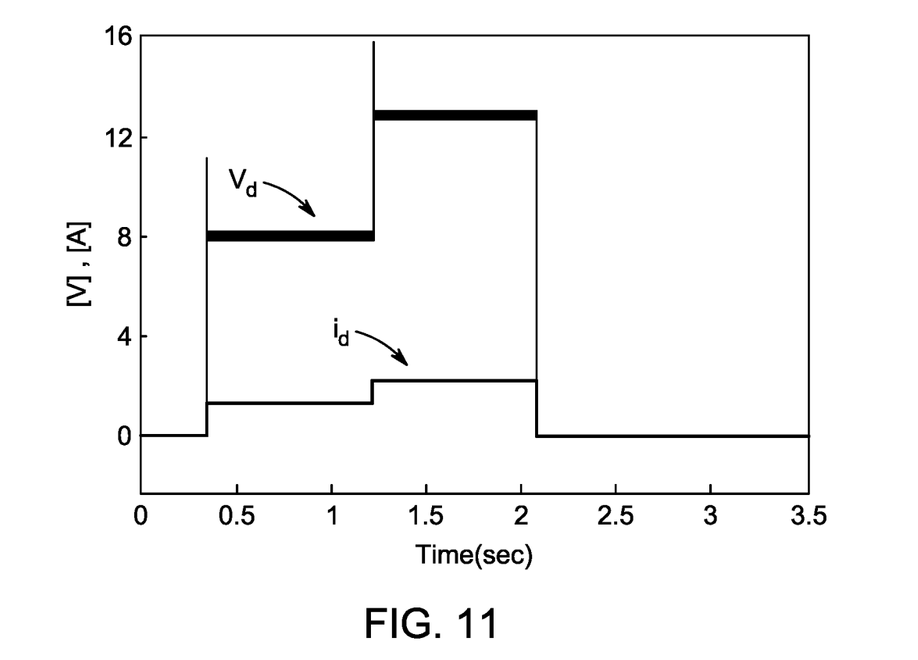
FIG. 11 shows the experimental determination of Rah for Motor B.

FIG. 11 shows the results during experimental determination of Rah. For both tested PMSMs, the estimation of η is obtained with a reasonable accuracy with less than 10% error, except the case of 1 turn winding short which shows an error of 24%. This high discrepancy is a result of the fact that 1 turn short short-circuit does not produce high enough voltage variation. In this case, it is hard to distinguish useful signals and noise from each other during the fault severity calculation. To increase the accuracy, a higher test current can be injected, which improves the signal to noise ratio (SNR) of the resulting voltages. Up to twice the rated current of the motor can be injected for a short time to avoid damage to the winding.

Tabulated in Table VI (FIG. 13F) are experimental results obtained when the proposed algorithm is conducted on Motor C, which is a 0.7 kW IPMSM, and provides further affirmation that the proposed solution can be applied in all AC motors. From Table VI, it can be seen that as the fault severity increases, the algorithm tends to lose accuracy and the estimated number of turn differ from the actual value by 1 or 2 turns. This is because the current controllers are tightly tuned based on the healthy motor inductance and resistance.

Figure 12:
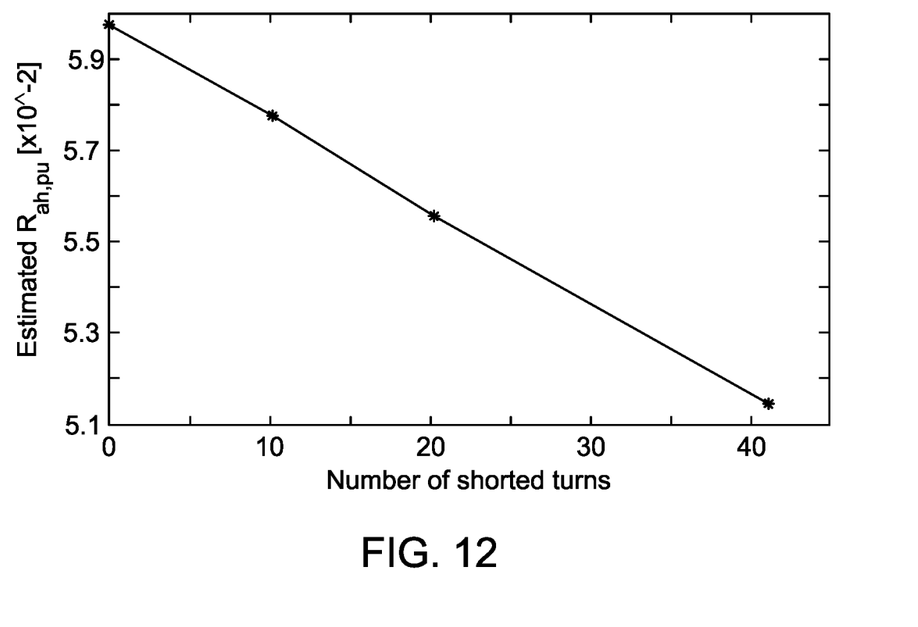
FIG. 12 shows the relationship between the number of shorted turns and the resistance of the remaining health coils for IPMSM.
Figure 13F:
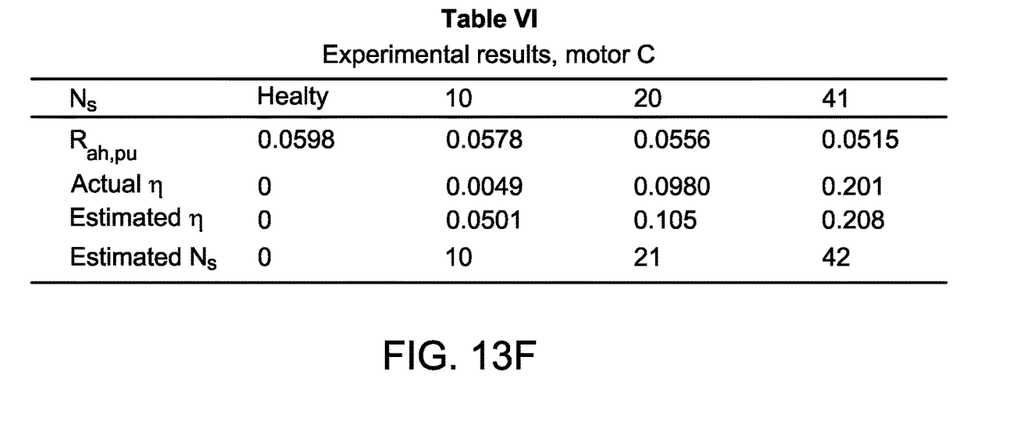
FIG. 13F shows Table VI.

As more turns are shorted, both the effective resistance and inductance decreases significantly, a situation that warrants re-tuning of the PI controllers. However, the estimated result is still reasonably close to the actual fault severity. FIG. 12 shows a plot of the results in Table VI, and depicts the inverse linear relationship between the number of shorted turns and the resistance of remaining healthy coils.

CONCLUSIONS

In this disclosure, a novel method and system that estimates number of shorted turns based on automatic measurement of resistance of the remaining healthy coils for PMSM is developed, with such method having been tested and verified through experimentation on several AC motors. The robust and easy to implement solution minimizes calculation errors caused by voltage distortion due to inverter non-linearity and dead-time effects. Analysis of the experimental results verifies that resistance of the remaining healthy coils shows an inverse linear relationship with the number of shorted turns. Based on this resistance value, information about the fault severity may be extracted.

Furthermore, experiments conducted on the test motors reveal that the amplitude of short circuit current increase considerably when the operating speed of the motor is increased, hence limiting the operation speed at a safe value, in order to avoid complete meltdown of the motor's winding may be desirable. In addition to that, it has been observed and established through experimentation that as more turns are shorted, higher short circuit current flows, which necessitates the estimation of the fault severity index, as described above. This method does not require additional sensors for voltage measurements and uses the signals available in the microcontroller to perform all calculations.

The method could be used in practice to communicate the severity of fault shorted coils to operators or other devices that could fully or partially shut down or recommend shut down of motors above certain fault thresholds. This communication could be through visible or audible alerts, or other communications.

While the invention has been described with reference to the embodiments above, a person of ordinary skill in the art would understand that various changes or modifications may be made thereto without departing from the scope of the claims.

The invention claimed is:

1. A method that estimates fault severity in a motor, the method comprising:
    exciting the motor with DC voltage at standstill to create a resulting DC current;
    calculating a phase resistance of the motor using the resulting DC current; and
    estimating the fault severity of inter turn short circuit (ITSC) faults as a fault severity index based on a winding resistance as seen by a d-axis of the motor, wherein the winding resistance is calculated based at least on the calculated phase resistance of the motor.

2. The method of claim 1, wherein the estimating of the fault severity is further based on an operating speed of the motor.

3. The method of claim 1, wherein the fault severity index is given by right side fraction of the equation, $$\frac{2}{3}\eta = 1 - \frac{R_{sk}}{R_s},$$

where Rah is resistance of healthy coils in the motor and Rs is the phase resistance of the motor.

4. The method of claim 1, wherein the motor is an AC motor.

5. The method of claim 4, wherein the AC motor is a Permanent Magnet Synchronous Motor (PMSM).

6. The method of claim 1, wherein the fault severity is estimated further based on self inductance of shorted turns.

7. The method of claim 1, wherein the PMSM is modeled as a 3-phase inverter (VSI) that generates three parallel currents ia, ib, and is through three resistors Rah, Rs, and Rs respectively, wherein the Rs resistors are connected in series to inductors Lss and AC voltage sources eb, and ec, wherein the Rah resistor is in parallel with the Rs resistors and in series with an inductor Lah and AC voltage source eah, and wherein the output from the AC voltage source eah travels through resistor Rf to generate generating current if, and in parallel resistor raf, inductor Laf, and AC voltage source eaf all in series.

8. The method of claim 1, wherein the estimation of the fault severity is further based on short circuit current.

9. The method of claim 1, wherein the calculation is carried out in a microcontroller.

10. The method of claim 9, wherein the estimation is carried out in a microcontroller.

11. The method of claim 1, wherein a number of shorted coils in the motor is based on the fault severity index.

* * * * *